(12) United States Patent
Nieberlein et al.

(10) Patent No.: US 9,392,652 B2
(45) Date of Patent: Jul. 12, 2016

(54) LIGHTING STRIP FOR AN AIRCRAFT INTERIOR AND AIRCRAFT INTERIOR EQUIPMENT WITH A PLURALITY OF LIGHTING STRIPS

(71) Applicant: DIEHL AEROSPACE GMBH, Ueberlingen (DE)

(72) Inventors: Uwe Nieberlein, Roth (DE); Jens Jordan, Nuremberg (DE)

(73) Assignee: DIEHL AEROSPACE GMBH, Ueberlingen (DE)

( * ) Notice: Subject to any disclaimer, the term of this patent is extended or adjusted under 35 U.S.C. 154(b) by 0 days.

(21) Appl. No.: 14/567,048

(22) Filed: Dec. 11, 2014

(65) Prior Publication Data

US 2015/0163872 A1 Jun. 11, 2015

(30) Foreign Application Priority Data

Dec. 11, 2013 (DE) .......................... 10 2013 020 668

(51) Int. Cl.
*H05B 37/00* (2006.01)
*H05B 33/08* (2006.01)
*B64D 47/02* (2006.01)
*B64D 11/00* (2006.01)

(52) U.S. Cl.
CPC ............ *H05B 33/0809* (2013.01); *B64D 47/02* (2013.01); *H05B 33/0803* (2013.01); *B64D 2011/0038* (2013.01); *B64D 2203/00* (2013.01)

(58) Field of Classification Search
CPC .................................................. H05B 33/0857
USPC .......... 362/470, 471; 315/185 R, 291, 299, 76
See application file for complete search history.

(56) References Cited

U.S. PATENT DOCUMENTS

| 6,641,294 | B2 * | 11/2003 | Lefebvre | B60Q 3/0259 |
| | | | | 315/185 R |
| 8,159,147 | B2 | 4/2012 | Schwalenberg et al. | |
| 2004/0135522 | A1 * | 7/2004 | Berman | H05B 33/0803 |
| | | | | 315/291 |
| 2006/0049782 | A1 | 3/2006 | Vornsand et al. | |
| 2011/0309746 | A1 | 12/2011 | Eckel et al. | |
| 2012/0038275 | A1 * | 2/2012 | Pohler | H05B 37/0254 |
| | | | | 315/77 |

(Continued)

FOREIGN PATENT DOCUMENTS

| DE | 102012006315 A1 | 10/2013 |
| EP | 2066149 A2 | 6/2009 |
| WO | WO2015075182 A2 | 5/2015 |

*Primary Examiner* — Thuy Vinh Tran
(74) *Attorney, Agent, or Firm* — Scully Scott Murphy and Presser

(57) ABSTRACT

A lighting strip for an aircraft interior is provided. The lighting strip has a connection for a network voltage, a rectifier for rectifying the network voltage into a power supply voltage, and a circuit board extending along a longitudinal extension of the lighting strip. Multiple LEDs are arranged on the circuit board and powered by the power supply voltage. A controllable current sink arrangement, having multiple individual sink devices connected electrically in parallel with one another, is provided for converting electrical energy transported via the connection into heat. The individual sink devices are distributed on the circuit board along the longitudinal extension of the circuit board. The sink devices are controlled by a control apparatus independently from the operative conditions of the LEDs to provide a homogenously distributed thermal profile of the lighting strip.

20 Claims, 4 Drawing Sheets

(56) References Cited

U.S. PATENT DOCUMENTS

| | | | | |
|---|---|---|---|---|
| 2013/0083483 | A1* | 4/2013 | Wei | H01L 23/467 361/697 |
| 2013/0249404 | A1 | 9/2013 | Eckel et al. | |
| 2013/0278139 | A1 | 10/2013 | Sievers et al. | |
| 2013/0313983 | A1 | 11/2013 | Radermacher | |

* cited by examiner

LIGHTING STRIP FOR AN AIRCRAFT INTERIOR AND AIRCRAFT INTERIOR EQUIPMENT WITH A PLURALITY OF LIGHTING STRIPS

BACKGROUND OF THE INVENTION

The invention relates to a lighting strip for an aircraft interior with the features of the preamble to Claim 1, and to aircraft interior equipment with a plurality of lighting strips.

DISCUSSION OF THE PRIOR ART

In aircraft, the aircraft interior is lit to offer the passengers a comfortable atmosphere and, in addition, to make sufficient light available for the passengers to be able, for example, to read during the flight. Lighting equipment of this sort is often implemented in the form of lighting strips that extend longitudinally through the aircraft interior.

Whereas formerly light bulbs or fluorescent tubes have been used for lighting aircraft interiors, LED lighting has now become established, since this is characterized by a low power consumption with, at the same time, a high light output, low weight and low heat generation.

In the applicant's patent application DE 10 2012 006315, not yet published, a lighting apparatus for an aircraft is proposed comprising a plurality of LEDs, wherein the LEDs are connected variously, depending on an applied power supply voltage, in order to be able to exploit the power supply voltage as effectively as possible at any time.

SUMMARY OF THE INVENTION

It is the object of the present invention to propose a lighting strip for an aircraft interior that is particularly easy to integrate and/or is characterized by particularly good operating properties.

The present invention is directed to a lighting strip suitable and/or designed for use in an aircraft interior. The lighting strip is used to radiate light into the aircraft interior. The lighting strip comprises a connection through which it is or can be coupled to a power supply network, in particular one of the aircraft. The lighting strip is designed to accept an alternating voltage through the connection as a network voltage from the power supply network for operation of the lighting strip. The alternating voltage preferably has an amplitude of between 80 and 150 volts and a frequency of between 400 Hz and 800 Hz.

The lighting strip comprises a rectifier that is used to rectify the alternating voltage into a power supply voltage. In particular, the rectifier is implemented as a bridge rectifier.

The lighting strip comprises a circuit board, wherein the circuit board extends along a longitudinal extension of the lighting strip. The longitudinal extension of the lighting strip is implemented with a greater length than the lateral extension of the lighting strip. A ratio between the longitudinal extension and the lateral extension is, for example, greater than 5:1, in particular greater than 10:1. The circuit board has an outline in which again the longitudinal extension is implemented with a greater length than the lateral extension. In particular, the circuit board extends over at least 90% of the longitudinal extension of the lighting strip. The circuit board is implemented in particular as a PCB (printed circuit board). It is particularly preferred for the circuit board to be implemented as one piece.

The lighting strip comprises a group of LEDs which are arranged on the circuit board and are, in particular, mechanically and electrically coupled to it. The LEDs are powered by the power supply voltage. The LEDs are arranged in an LED network that is in particular controllable, wherein the LED network can adopt different operating states. The different operating states of the LED network permit the LED network to be adapted to the instantaneous value of the power supply voltage. It is thus for example possible for the LEDs or partial groups of LEDs to be switched over from a parallel connection to a series connection, or in the opposite direction, so that the nominal voltage required by the LED network is adapted to the instantaneous value of the power supply voltage.

It is also possible for LEDs or partial groups of LEDs to be selectively activated, deactivated and/or bypassed in order to change the required nominal voltage.

The lighting strip furthermore comprises a controllable current sink arrangement which is designed to convert electrical energy transported via the connection into heat. The current sink arrangement can convert greater or smaller amounts of electrical energy into heat depending on a control signal. The current sink arrangement serves to adapt the current power requirement of the lighting strip in such a way that the network current drawn from the power supply network changes in parallel with the power supply voltage. The current sink arrangement is associated with at least one group, in particular with a plurality of groups of the LEDs of the lighting strip. In particular the lighting strip comprises precisely one current sink arrangement that is assigned to all the LEDs of the lighting strip. The current sink arrangement is thus assigned to the LED network. In particular the power factor, which refers to the ratio between the magnitudes of the real power and apparent power, is increased through the activation of the current sink arrangement. In particular the power factor associated with the lighting strip is greater than 0.9, in particular greater than 0.98. The distortion factor of the lighting strip is, moreover, reduced through a suitable activation of the current sink arrangement.

The lighting strip comprises a control apparatus that is designed to control the current sink arrangement in order—as described—to keep the power factor high and/or the distortion factor low. For example the control apparatus can receive the network voltage or an electrical magnitude that is equivalent or proportional to it, as an input signal, so that the activation of the current sink arrangement can be performed synchronously with or depending on the change of the network voltage over time.

It is proposed that in the context of the invention the current sink arrangement comprises a plurality of individual sink devices connected electrically in parallel with one another for converting the electrical energy into heat. The physical location at which the conversion of electrical energy into heat takes place is thus distributed over the plurality of individual sink arrangements. Preferably the lighting strip comprises more than 10, in particular more than 15 individual sink devices. According to the invention, the individual sink devices are arranged distributed on the circuit board along with the longitudinal extension of the circuit board. For example the individual sink devices are arranged distributed in one row, two rows or more rows, in a grid or in no particular order along the longitudinal extension.

The advantage of the invention is that through dividing the current sink arrangement over a plurality of individual sink devices, the heat generated from the conversion of electrical energy is distributed more evenly along the longitudinal extension of the lighting strip. In this way it is ensured that the temperature of the lighting strip is not increased at a central point of the current sink arrangement to such an extent that malfunctions of the neighbouring LEDs or even damage to the lighting strip is avoided. Particularly preferably this achieves a homogenously distributed thermal profile of the lighting strip when the lighting strip is operating.

In a particularly preferred implementation of the invention, the power supply voltage present at the LED network is formed as a series of half-waves, rectified alternating voltage. In the event that the power supply network provides a sinusoidal alternating voltage, the power supply voltage exhibits a waveform wherein all the half-waves of the alternating voltage are uniformly "folded upwards". Particularly preferably the LED network is connected directly to the rectifier, wherein a separate, active harmonic filter (PFC) is not required. Through the absence of the active harmonic filter, the physical volume, cost and weight of the lighting strip are reduced.

Preferably the control apparatus is furthermore designed to control the operating states of the LED network depending on the power supply voltage which is changeable over time. It is thus particularly preferred that the group of LEDs in the LED network are connected together in such a way depending on a currently present instantaneous value of the power supply voltage that the nominal voltage required at the LED network is smaller than the instantaneous value. On the other hand, the control apparatus is implemented in such a way that the operating state is chosen in which the required nominal voltage approaches as close as possible to the instantaneous value of the power supply voltage in order to achieve a maximum light output. It would be desirable for the required nominal voltage to always correspond to the instantaneous value of the power supply voltage that is present. However, due to the nominal voltages of the LED network only being discretely adjustable, this is not possible, wherein however differences between the required nominal voltage and the instantaneous value of the power supply voltage are compensated for by the actuation of the current sink arrangement in such a way that the lighting strip exhibits a high power factor and/or a low distortion factor. The control of the LED network and of the current sink arrangement can be made synchronous with the power supply voltage. Either fast regulators or previously prepared and stored nominal values can be chosen to be used for the controller.

It is particularly preferred for the control apparatus to be designed to control the current sink arrangement and the LED network when the power supply voltage falls below a previously specifiable minimum voltage in such a way that the LED network is by passed, and the power is converted into heat by the current sink arrangement. Through this development it is achieved that in the transit region between two half-waves of the power supply voltage, the network current in the power supply network is not temporarily forced to zero, whereby the power factor of the lighting strip would be reduced. Instead, power is converted to heat by the current sink arrangement during that period of time. This does indeed on the one hand lower the efficiency of the lighting strip, but on the other hand however the power factor is significantly improved. Since in an aircraft a plurality of lighting strips of this type are arranged, and therefore the lighting strips, due to their large number, must be considered as a major power consumer, the additional power consumption by the current sink arrangement can easily be accepted when balanced against the improvement in the power factor.

In a particularly preferred embodiment of the invention, the individual sink devices each comprise at least or precisely one transistor as a controllable energy converter. The transistors are operated by the control apparatus or by subsequent electronics in an analogue mode, so that they have an internal power loss and thus convert electrical energy into heat. This conversion results in the transistors heating up. In this way the individual sink devices can be implemented economically and reliably.

In one particularly preferred implementation of the invention, the ratio of the number of LEDs to the number of individual sink devices is at least 1:1, preferably at least 3:1. On the other hand, it is preferred for the ratio to be less than 40:1, preferably less than 20:1. Thus, on average or as a mean, at least one, preferably at least three LEDs and/or a maximum of 40, preferably a maximum of 20 LEDs are assigned to each individual sink device.

In one simple form of embodiment of the invention, the individual sink devices are arranged equidistantly along the longitudinal extension of the circuit board. Realistically however it is often the case that additional, larger components or groups of components have to be integrated onto the circuit board, so that there are intermediate regions on the circuit board that are free from individual sink devices. For this reason it is preferably required that the average distance between the individual sink devices is greater than 2 centimeters, preferably greater than 3 centimeters and/or less than 10 centimeters, preferably less than 6 centimeters. Viewed in the longitudinal extent, the individual sink devices located at the outside or at the edge define the total length of the current sink arrangement. Preferably the total length of the current sink arrangement takes up at least 70%, preferably at least 80% of the total length of the circuit board in the longitudinal extent.

The longitudinal extent of the circuit board is preferably designed to be greater than 40 centimeters, and in particular greater than 90 centimeters. This length enables an aircraft interior to be fitted with a limited number of lighting strips.

In one preferred constructive implementation of the invention, the lighting strip comprises a transparent cover for the circuit board which is placed on or arranged over the circuit board in the direction in which the LEDs radiate. An interior space is created between the circuit board and the cover, wherein the maximum height of the interior space is designed to be less than 3 centimeters, and preferably less than 2 centimeters. In other words, the lighting strip should be implemented in as flat a form as possible, so that it can be integrated into the aircraft interior particularly easily. Through the flat characteristic of the lighting strip, the problem of heat generation by the current sink arrangement is further aggravated. In this embodiment, the advantages of the invention of distributing the thermal radiation of the current sink arrangement through the use of a plurality of individual sink devices that are distributed over the longitudinal extension of the circuit board are thus particularly valuable.

It is preferably provided that a thermal profile that is created by the heat radiation of the individual sink devices is homogenous in form over the longitudinal extension of the lighting strip, in particular of the circuit board. It is particularly preferable here that, viewed in the longitudinal extent, the maximum difference of the temperature profile created as a result of the heat radiation of the individual sink devices is less than 5 degrees Celsius, preferably less than 3 degrees Celsius.

In one possible embodiment of the invention, the LEDs of the group are implemented exclusively as white LEDs or—alternatively—as LEDs with different colours including white.

In an alternative embodiment of the invention, the lighting strip comprises a further group of LEDs, wherein, for example, the first group of LEDs is fitted exclusively with white LEDs, and the further group of LEDs is fitted with coloured LEDs. Furthermore in this embodiment the lighting strip includes a further current sink arrangement which comprises further individual sink devices. The two groups of LEDs and the two current sink arrangements are distributed independently of one another on the circuit board. It is, however, particularly preferred here for them to be controlled by the same control apparatus.

A further object of the invention relates to aircraft interior equipment with a plurality of lighting strips according to the present invention. For example, the lighting strips are integrated into what are known as the aircraft's hat racks.

BRIEF DESCRIPTION OF THE DRAWINGS

Further features, advantages and effects of the invention emerge from the following description of a preferred exemplary embodiment of the invention.

DETAILED DESCRIPTION OF THE INVENTION

Figure 1:
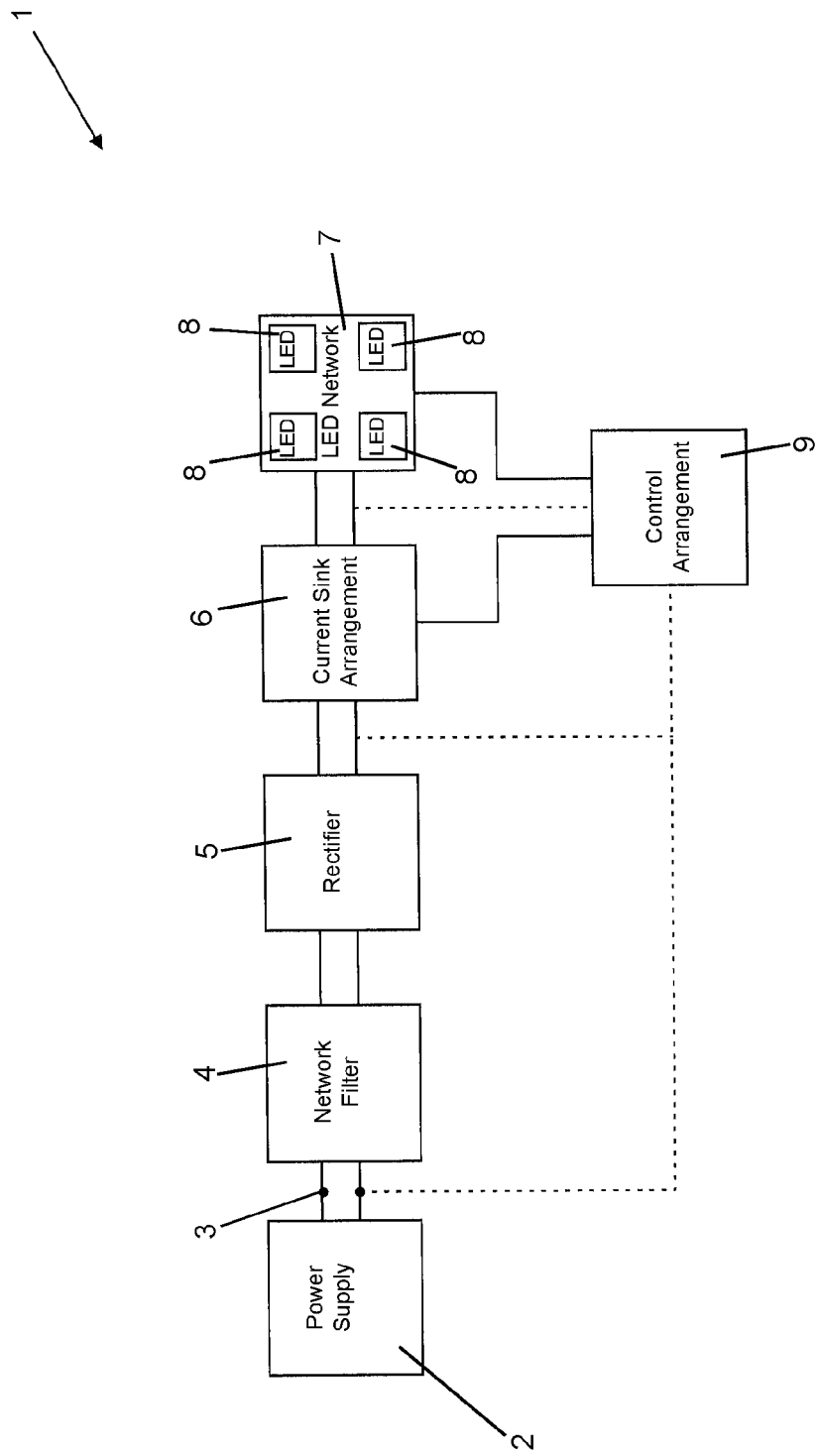
FIG. 1 shows a schematic block diagram of a lighting strip as an exemplary embodiment of the invention.

FIG. 1 shows a schematic block illustration of the electrical components of a lighting strip 1 which is designed for operation with an alternating voltage power supply 2 of a power supply network. The lighting strip is used, for example, for lighting the interior of an aircraft in the passenger compartment. The lighting strip is connected to the alternating voltage power supply 2, from which it obtains a network voltage and a network current. After an input 3 to the lighting strip 1 there follows optionally a network filter 4 which is designed to filter interference that could be coupled back into the alternating voltage power supply 2. This is, in particular, a low-pass filter which can for example be constructed by an interconnection of capacitors and inductors. A rectifier 5 follows the network filter 4, being designed to convert the connected network voltage, or the filtered network voltage, into a rectified power supply voltage. The rectifier 5 is constructed, for example, as a bridge rectifier.

Both the rectified power supply voltage and the rectified power supply current are passed on through a current sink arrangement 6 to an LED network 7 with a plurality of LEDs 8 or groups of LEDs 8. Optionally the positions of the current sink arrangement 6 and of the LED network 7 can be exchanged. The current sink arrangement 6 is thus associated with all the LEDs 8 of the LED network 7.

The lighting strip 1 moreover comprises a control apparatus 9 which is designed for operation of the LED network 7 and the current sink arrangement 6. For example the control apparatus 9 is implemented as a microcontroller. As an input signal the control arrangement 9 receives, for example, the chain voltage, which also corresponds to the power supply voltage. As an alternative to this, the control arrangement 9 receives the power supply voltage or the network voltage as the input signal.

Figure 2:
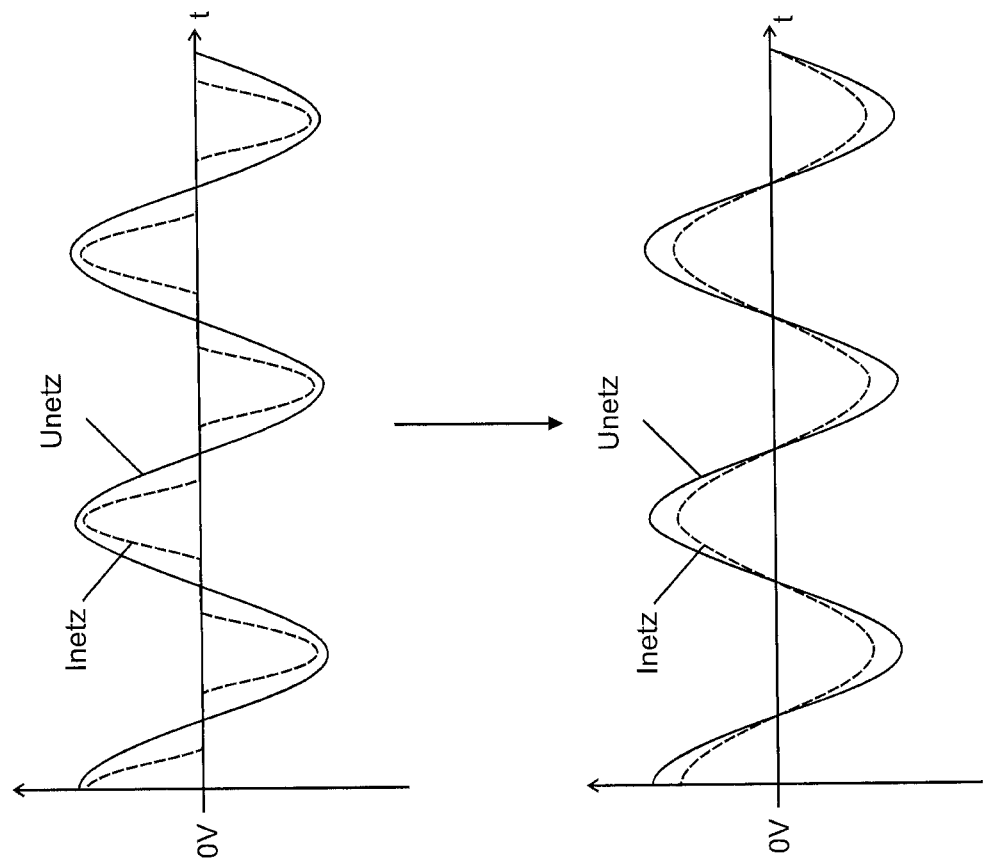
FIGS. 2A and 2B illustrate different operating states of the lighting strip, with the power factor shown in FIG. 2A being comparatively poor to that shown in FIG. 2B.

In FIG. 2a a solid line shows the curve of the network voltage Unetz over time as an alternating voltage in the power supply network 2. This is a sinusoidal curve, in particular a sine curve. After the rectifier 5, the half-waves which are arranged below the zero-volt line, are symmetrically folded upwards, so that a pulsed direct voltage with half-waves results as the power supply voltage, wherein each half-wave exhibits a sinusoidal form.

The LED network 7 can adopt different operating states, wherein the nominal voltage required by the operating states is designed to be different. The change of the operating states can be implemented through activating and deactivating individual LEDs 8 or partial groups of the LEDs 8. Alternatively or in addition, the type of interconnection, for example from series interconnection to parallel interconnection or in the opposite direction, can be changed. In this way it is possible to adjust the necessary nominal voltage of the LED network 7 to the instantaneous value of the power supply voltage.

It is, moreover, advantageous, at least during the zero-transit of the power supply voltage, to entirely bypass the LED network 7, since in the region of the zero-volt line, the voltage falls below the minimum voltage of the LED network 7. This leads—as is shown in FIG. 2a—to the network current Inetz being at zero for a certain period of time during the zero-transit of the power supply voltage, so that the power factor is comparatively poor.

Through the operation of the current sink arrangement 6, power can be artificially consumed by conversion into heat, so that the network voltage and the network current proceed in parallel, as is illustrated in FIG. 2b. By this means the power factor of the lighting strip 1 is significantly increased. The current sink arrangement 6 can be operated in such a way also during each half-wave of the power supply voltage that the power factor is high.

Figure 3:
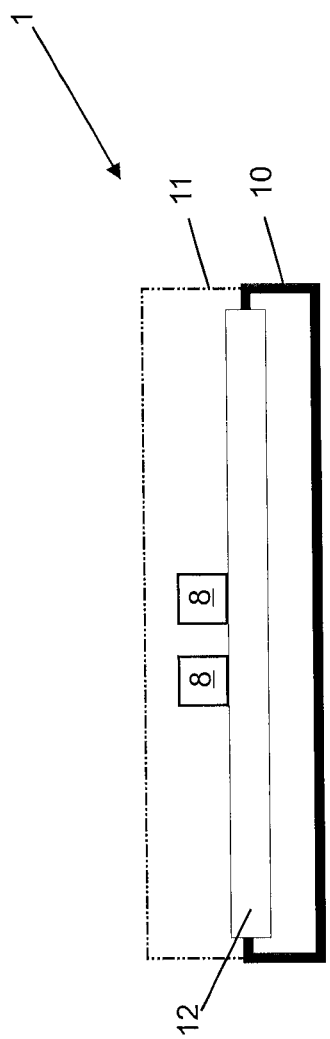
FIG. 3 shows a schematic cross section through the lighting strip of the preceding figures.

The heat from the current sink arrangement 6 produced because of the artificial power consumption can, however, become problematic. FIG. 3 shows a schematic cross section through the lighting strip 1, wherein it can be seen that the lighting strip 1 comprises a base piece 10, a cover 11 and a circuit board 12. The circuit board 12 is arranged in the base piece 10, and carries—as will be explained in more detail below—the LEDs 8. The cover 11 is of a transparent implementation, and allows the distribution of the light radiation of the LEDs 8 into the interior of the aircraft.

Figure 4:
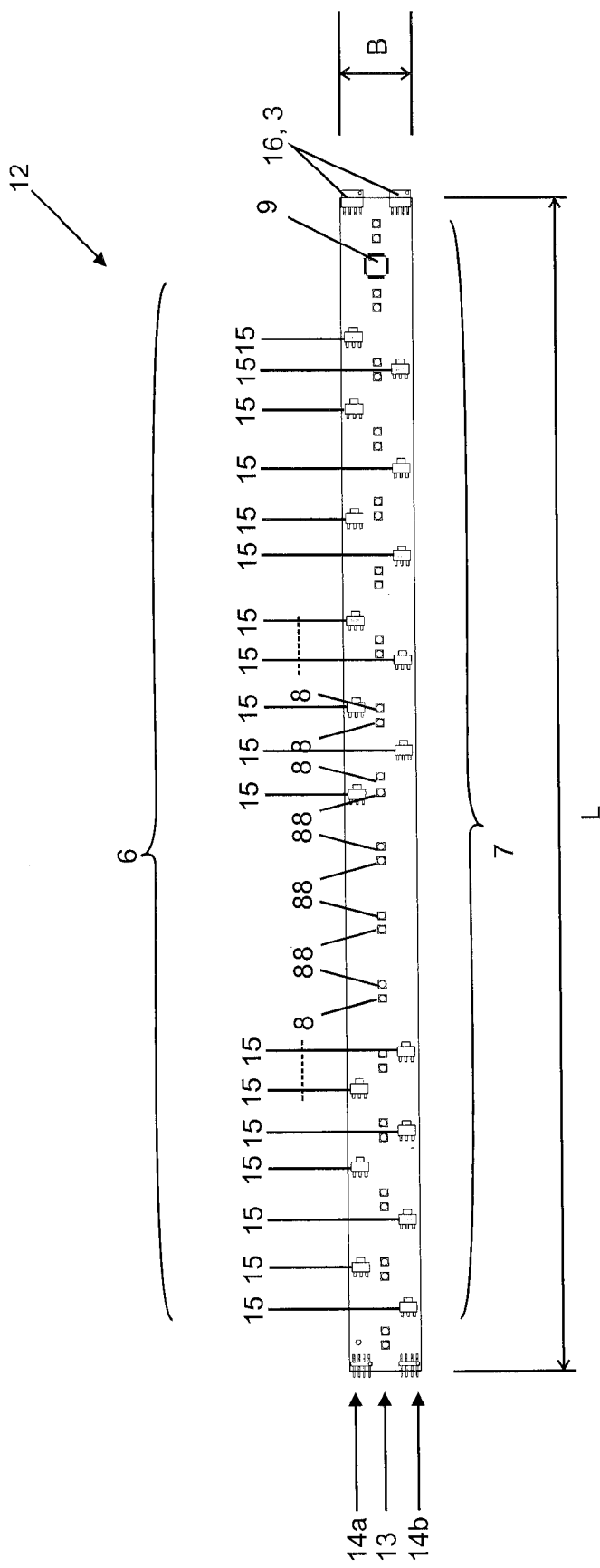
FIG. 4 shows a schematic illustration of signals of the lighting strip.

FIG. 4 shows a schematic plan view of the circuit board 12, wherein only a portion of the electronic components is illustrated and other components are hidden in the drawing. The outline of the circuit board 12 is rectangular, wherein the length L of the longitudinal extension is significantly larger than the width B of the lateral extension. The length L is, for example, 10 times as great as the width B. The circuit board 12 is, for example, implemented as a PCB fitted with components.

In a central row 13, the LEDs 8 in this example are arranged in pairs, transistors 15 are arranged in two outer rows 14a, b, constituting individual sink devices of the current sink arrangement 6. The current sink arrangement 6 is thus divided into a large number of individual sink arrangements. The control apparatus 9 is also shown on the circuit board 12. Plugs 16 comprise a connection as the input 3 to the lighting strip 1. The rectifier 5 is not illustrated.

The individual sink devices implemented as transistors 15 are connected electrically in parallel to one another and in operation—when power is to be converted into heat—are operated in what is known as an analogue mode, so that internal power losses are induced in the transistors, and the transistors 15 themselves heat up due to the conversion of the power or of the electrical energy into heat. Each of the transistors 15 thus, as individual sink devices, constitutes a heat source of the current sink arrangement 6.

The individual sink devices constituted as transistors 15 are distributed along the longitudinal extension L of the circuit board 12, where, in the exemplary embodiment illustrated, each transistor 15 is, as a mean or an average, assigned to one or two LEDs 8. These do not have to be neighbouring LEDs 8, but rather the LEDs 8 as a whole are connected together into the LED network 7, which is connected serially to the current sink arrangement 6. The spacing between the transistors 15 in the longitudinal extent of the length L is smaller than the width B of the circuit board 12. In one exemplary embodiment, the length L of the circuit board 12 can have a value of 45 centimeters, so that as a mean one of the individual sink devices 16 is arranged every 2-3 centimeters.

LIST OF REFERENCE SIGNS

1 Lighting strip
2 Alternating voltage power supply
3 Input
4 Network filter
5 Rectifier
6 Current sink arrangement
7 LED network
8 LEDs
9 Control apparatus
10 Base piece
11 Cover
12 Circuit board
13 Centre row
14a,b Outer rows
15 Transistors
16 Plug
B Width of the lateral extent
L Length of the longitudinal extension

What is claimed is:

1. A lighting strip for an aircraft interior, comprising:
a connection for a network voltage in the form of an alternating voltage from a power supply network,
a rectifier for rectifying the network voltage into a power supply voltage,
a circuit board, wherein the circuit board extends along a longitudinal extension of the lighting strip,
a group of LEDs, wherein the LEDs are arranged on the circuit board and are powered by the power supply voltage, wherein the LEDs are arranged in an LED network and wherein the LED network adopts different operating states,
a controllable current sink arrangement for converting electrical energy transported via the connection into heat, and
a control apparatus for controlling the current sink arrangement,
wherein the current sink arrangement comprises a plurality of individual sink devices connected electrically in parallel with one another for converting the electrical energy into heat,
wherein the individual sink devices are distributed on the circuit board along the longitudinal extension of the circuit board, and
wherein the individual sink devices are controlled by the control apparatus independently from the operative conditions of the LEDs, thereby providing a homogenously distributed thermal profile of the lighting strip.

2. The lighting strip according to claim 1, wherein the power supply voltage at the LED network comprises a series of sinusoidal half-waves.

3. The lighting strip according to claim 1, wherein the control apparatus is adapted to control the operating states of the LED network depending on at least one of the power supply voltage and the network voltage, which is changeable over time.

4. The lighting strip according to claim 1, wherein the control apparatus is adapted to control the current sink arrangement and the LED network when the power supply voltage falls below a minimum voltage in such a way that the LED network is bypassed, and power is converted into heat by the current sink arrangement.

5. The lighting strip according to claim 1, wherein the individual sink devices comprise transistors as controllable energy converters.

6. The lighting strip according to claim 1, wherein the control apparatus is adapted to control the LED network and the current sink arrangement in such a way that a power supply current from the power supply network is formed such that a power factor of the lighting strip is greater than 0.9.

7. The lighting strip according to claim 1, wherein the control apparatus is adapted to control the LED network and the current sink arrangement in such a way that a power supply current from the power supply network is formed such that a power factor of the lighting strip is greater than 0.98.

8. The lighting strip according to claim 1, wherein the ratio between the number of LEDs and the number of individual sink devices is at least 1:1.

9. The lighting strip according to claim 1, wherein the ratio between the number of LEDs and the number of individual sink devices is at minimum 3:1 or at maximum 40:1.

10. The lighting strip according to claim 1, wherein the ratio between the number of LEDs and the number of individual sink devices is at maximum 20:1.

11. The lighting strip according to claim 1, wherein the average distance between the individual sink devices is greater than 2 cm.

12. The lighting strip according to claim 1, wherein the average distance between the individual sink devices is greater than 3 cm or less than 10 cm.

13. The lighting strip according to claim 1, wherein the average distance between the individual sink devices is less than 6 cm.

14. The lighting strip according to claim 1, wherein the length of the circuit board in the longitudinal extension adapted to be greater than 40 cm.

15. The lighting strip according to claim 1, wherein the length of the circuit board in the longitudinal extension is adapted to be greater than 90 cm.

16. The lighting strip according to claim 1, further comprising a transparent cover for the circuit board, wherein the circuit board and the cover define an interior space, wherein the height of the interior space is less than 3 cm.

17. The lighting strip according to claim 16, wherein the height of the interior space is adapted to be less than 2 cm.

18. The lighting strip according to claim 16, wherein the individual sink devices are distributed in such a way that the thermal profile that is created by the heat radiation of the individual sink devices is homogenous over the longitudinal extension.

19. The lighting strip according to claim 1, wherein the LEDs consist of white LEDs or the LEDs consist of LEDs with different colours.

20. An aircraft interior apparatus, comprising a lighting strip, wherein the lighting strip comprises a connection for a network voltage in the form of an alternating voltage from a power supply network, a rectifier for rectifying the network voltage into a power supply voltage, a circuit board, wherein the circuit board extends along a longitudinal extension of the lighting strip, a group of LEDs, wherein the LEDs are arranged on the circuit board and are powered by the power supply voltage, wherein the LEDs are arranged in an LED network and wherein the LED network adopts different operating states, a controllable current sink arrangement for converting electrical energy transported via the connection into heat, and a control apparatus for controlling the current sink arrangement, wherein the current sink arrangement comprises a plurality of individual sink devices connected electrically in parallel with one another for converting the electrical energy into heat, wherein the individual sink devices are distributed on the circuit board along the longitudinal extension of the circuit board, and wherein the individual sink devices are controlled by the control apparatus independently from the operative conditions of the LEDs, thereby providing a homogeneously distributed thermal profile of the lighting strip.

* * * * *